United States Patent
Sawai

(10) Patent No.: US 7,260,811 B2
(45) Date of Patent: Aug. 21, 2007

(54) METHOD OF CALCULATING PREDICTIVE SHAPE OF WIRING STRUCTURE, CALCULATING APPARATUS, AND COMPUTER-READABLE RECORDING MEDIUM

(75) Inventor: Masayoshi Sawai, Kosai (JP)

(73) Assignee: Yazaki Corporation, Tokyo (JP)

( * ) Notice: Subject to any disclaimer, the term of this patent is extended or adjusted under 35 U.S.C. 154(b) by 284 days.

(21) Appl. No.: 11/133,261

(22) Filed: May 20, 2005

(65) Prior Publication Data
US 2005/0262469 A1    Nov. 24, 2005

(30) Foreign Application Priority Data
May 21, 2004    (JP)    ............ P 2004-151759

(51) Int. Cl.
   *G06F 17/50*    (2006.01)
(52) U.S. Cl. ............... 716/20; 716/12; 716/20
(58) Field of Classification Search ............ 716/1, 716/11, 12, 18, 20
See application file for complete search history.

(56) References Cited

U.S. PATENT DOCUMENTS

2005/0203663 A1*   9/2005   Sawai ................. 700/182

FOREIGN PATENT DOCUMENTS

| EP | 1 130 527 A2 | 9/2001 |
| --- | --- | --- |
| EP | 1 275 565 A1 | 1/2003 |
| JP | 2001-250438 A | 9/2001 |
| JP | 2002-231074 A | 8/2002 |
| JP | 2002-373533 A | 12/2002 |
| JP | 2003-22720 A | 1/2003 |
| JP | 2003-22721 A | 1/2003 |
| JP | 2003-141197 A | 5/2003 |
| JP | 2003-141949 A | 5/2003 |
| JP | 2003-151383 A | 5/2003 |
| WO | WO 02/071794 A1 | 9/2002 |

OTHER PUBLICATIONS

B. Nath, translated by Takashi Yokoyama, "Matrix Finite Element Process", published on Aug. 10, 1978 by Brian Books Publishing Co., Ltd., [Original title of this publication] Fundamentals of Finite Elements for Engineers by B. Nath * This publication is translated into Japanese with a different title.

* cited by examiner

*Primary Examiner*—Thuan Do
(74) *Attorney, Agent, or Firm*—Sughrue Mion, PLLC

(57) ABSTRACT

In a calculating apparatus for calculating a predictive shape of a wire structure using a finite element model, a predictive shape of the finite element model which is in a physically balanced condition based on physical properties and restriction conditions is calculated. When it is determined that the predictive shape of the finite element model crosses an obstacle model, the control point of the finite element model is returned to a position corresponding to a position immediately before the crossing of the joint with the obstacle model and a crossing joint which is the joint crossing with the obstacle model is bound to a contact point of the finite element model with the obstacle model. The predictive shape is output when the control point is returned to a position at the time of crossing of the finite element model with the obstacle while maintaining the binding.

9 Claims, 10 Drawing Sheets

FIG. 2

| DEGREE OF FREEDOM OF RESTRICTIONS / SUPPORT MEMBER | | TRANSLATION IN THE DIRECTION OF X-AXIS | TRANSLATION IN THE DIRECTION OF Y-AXIS | TRANSLATION IN THE DIRECTION OF Z-AXIS | ROTATION AROUND X-AXIS | ROTATION AROUND Y-AXIS | ROTATION AROUND Z-AXIS |
|---|---|---|---|---|---|---|---|
| COMPLETE RESTRICTION | CONNECTOR | IMPOSSIBLE | IMPOSSIBLE | IMPOSSIBLE | IMPOSSIBLE | IMPOSSIBLE | IMPOSSIBLE |
| COMPLETE RESTRICTION | ELONGATED HOLE CLIP | IMPOSSIBLE | IMPOSSIBLE | IMPOSSIBLE | IMPOSSIBLE | IMPOSSIBLE | IMPOSSIBLE |
| ROTARY RESTRICTION | ROUND HOLE CLIP | IMPOSSIBLE | IMPOSSIBLE | IMPOSSIBLE | IMPOSSIBLE | IMPOSSIBLE | POSSIBLE |
| ROTARY RESTRICTION | CORRUGATED ELONGATED HOLE CLIP | IMPOSSIBLE | IMPOSSIBLE | IMPOSSIBLE | POSSIBLE | IMPOSSIBLE | IMPOSSIBLE |
| ROTARY RESTRICTION | CORRUGATED ROUND HOLE CLIP | IMPOSSIBLE | IMPOSSIBLE | IMPOSSIBLE | POSSIBLE | IMPOSSIBLE | POSSIBLE |
| COMPLETE RESTRICTION | BRANCH POINT | POSSIBLE | POSSIBLE | POSSIBLE | POSSIBLE | POSSIBLE | POSSIBLE |

FIG. 10A
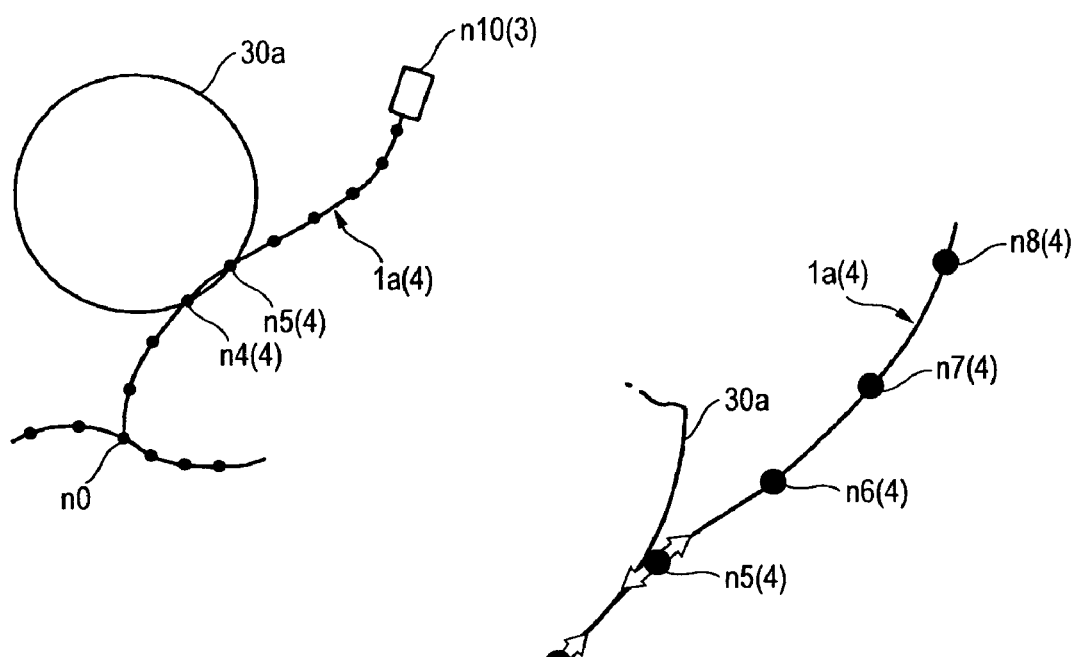
FIG. 10B
FIG. 10C
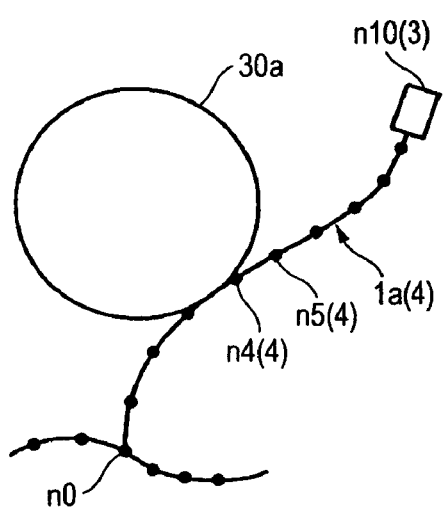

METHOD OF CALCULATING PREDICTIVE SHAPE OF WIRING STRUCTURE, CALCULATING APPARATUS, AND COMPUTER-READABLE RECORDING MEDIUM

BACKGROUND OF THE INVENTION

The present invention relates to a method of calculating a predictive shape of a wire structure, which comes into contact with an obstacle and deforms, using the finite element process and a calculating apparatus and a computer-readable recording medium for the method of calculating a predictive shape of a wire structure.

Usually, plural electric devices are mounted on a vehicle or the like. These electric devices are connected by wire structures called wire harnesses, which are formed by binding plural electric wires or communication lines using binding members such as an insulation lock or protective members such as tapes, as wire materials. As shown in FIG. 1, connectors 2a, 2b, 2c, and 2d, which are connected to electric devices and the like, are attached to respective ends of a wire harness 1. The wire harness 1 has branch wires and various clips 3a, 3b, 3c, and 3d are attached to middle parts of the branch wires. The wire harness 1 further has a branch point 4. Not that, since the branch wires of such a wire harness 1 basically have different numbers and types of wire materials forming the branch wires, the respective branch wires have various thicknesses, lengths, elasticities, rigidities, and the like.

Recently, assuming that such a wire harness is cabled in predetermined sections in a vehicle, as a method of predicting shapes of the wire harnesses, a support system by a computer, in which CAD (Computer Aided Design), CAE (Computer Aided Engineering), and the like are combined, is often used. As a basic method of this support system, a detailed shape of the wire harness, on which thicknesses, lengths, types, and the like of electric wires are reflected, are modeled and rendered using the CAD and, then, necessary data are inputted to predetermined general-purpose CAE as numerical values to cause the CAE to calculate predictive shapes. After evaluating a result of this calculation, predictive shapes are rendered again using the CAD. Then, such a cycle is repeated by a designer, who is proficient in operation of the CAD, the general-purpose CAE, and the like, in a trial and error manner.

Here, references cited in this specification are as described below.

"Matrix Finite Element Process" written by B. Nass, published by the Brain Book Publishing Co., Ltd., Aug. 10, 1978, p. 7 to 15.

"Mode Analysis and Dynamic Design" written by Hitohiko Yasuda, issued by the Corona Co., Ltd., Nov. 10, 1993, p. 54 to 56.

Actually, as shown in FIG. 1, in a section where a wire harness is assumed to be cabled, an obstacle 30 such as an electric device or a projection is often present. Then, a point of contact of the obstacle 30 and the wire harness changes in accordance with deformation of the wire harness. Therefore, it is desirable to calculate a point of contact of the obstacle 30 and the wire harness that changes serially and, then, predict a path of the wire harness with the point of contact reflected on the prediction. However, the wire harness has various numbers and types of wire materials forming the wire harness and various thicknesses, lengths, elasticities, rigidities, and the like of respective wires. Therefore, even if there is no obstacle, it is considered difficult to predict accurate paths of the wire harness. However, a method of predicting a path of a wire harness taking into account such a changing point of contact has not been proposed.

Therefore, in the related design method, there is no way but to predict a path of a wire harness neglecting an obstacle and, then, when an obstacle is present on the predicted path, predict a path again so as to avoid the obstacle or to set a fixed binding point appropriately on the wire harness at the beginning so as to avoid the obstacle and predict a path of the wire harness. Therefore, a method, which can improve this point and predict a path of a wire harness accurately, has been expected.

SUMMARY OF THE INVENTION

Thus, in view of the present circumstances described above, it is an object of the invention to provide a calculating method and an apparatus and a recording medium for the calculating method that can output a predictive shape of a wire structure such as a wire harness that comes into contact with an obstacle and deforms.

In order to achieve the above object, according to the present invention, there is provided a method of calculating a predictive shape of a wire structure, comprising of:

providing a finite element model of the wire structure, the finite element model being formed as an elastic body having a plurality of linearity beam elements combined at respective joints;

setting physical properties and restriction conditions of the wire structure to the finite element model;

calculating a predictive shape of the finite element model which is in a physically balanced condition based on the physical properties and the restriction conditions;

determining whether the predictive shape of the finite element model crosses an obstacle model representing an obstacle when a control point of the wire structure is displaced;

returning the control point of the finite element model to a position corresponding to a position immediately before the crossing of the joint with the obstacle model, and binding a crossing joint which is the joint crossing with the obstacle model, to a contact point of the finite element model with the obstacle model, when it is determined that the predictive shape crosses the obstacle model; and outputting the predictive shape at the time when the control point is returned to a position of the crossing while maintaining the binding.

Preferably, in the process of binding the crossing joint, the crossing joint is at least one of a crossing joint which comes into contact with the obstacle model first and a crossing joint which crosses the obstacle model most deeply, among crossing joints.

Preferably, the method further comprising of:
calculating a predictive shape of the finite element model at the time when the binding of the crossing joint is released and the control point is displaced to the next position at the time of the crossing.

Preferably, the method further comprising of:
calculating a predictive shape of the finite element model at the time when only a degree of freedom in a tangential direction is allowed to a joint which is bound at the contact point and the control point is displaced to the next position at the time of the crossing.

According to the present invention, there is also provided a calculating apparatus for calculating a predictive shape of a wire structure, comprising:

a finite element model creating unit that creates a finite element model of the wire structure, the finite element model being formed as an elastic body having a plurality of beam elements combined at respective joints linearity;

a setting unit that sets physical properties and restriction conditions of the wire structure to the finite element model;

a predictive shape calculating unit that calculates a predictive shape of the finite element model which is in a physically balanced condition based on the physical properties and the restriction conditions;

a crossing determining unit that determines whether the predictive shape of the finite element model crosses an obstacle model representing an obstacle when a control point of the wire structure is displaced;

a joint binding unit that returns the control point of the finite element model to a position corresponding to a position immediately before the crossing of the joint with the obstacle model, and that binds a crossing joint which is the joint crossing with the obstacle model, to a contact point of the finite element model with the obstacle model, when it is determined that the predictive shape crosses the obstacle model; and a predictive shape output unit that outputs the predictive shape at the time when the control point is returned to a position at the time of crossing of the finite element model with the obstacle model while maintaining the binding.

According to the present invention, there is also provided a computer-readable recording medium for causing a computer to execute the above method of calculating a predictive shape of a wire structure.

According to the above method, the calculating apparatus and the recording medium of the invention, a finite element model is created assuming that a wire structure to be an object of design is an elastic body in which plural beam elements keeping linearity are combined at respective joints and a predictive shape, which is a state in which the finite element model is physically balanced, corresponding to physical properties and restriction conditions of the wire structure given to the finite element model is calculated. In addition, it is judged whether the predictive shape crosses an obstacle model when a control point of the wire structure is displaced. When it is judged that the predictive shape crosses the obstacle, the control point is returned to a position corresponding to a position immediately before the crossing and a crossing joint, which is a joint crossing the obstacle model, is bound at a point of contact with the obstacle model. Then, a predictive shape at the time when the control point is returned to the position at the time of crossing while maintaining the binding is output. Therefore, it is possible to output a predictive shape approximated to a state in which the wire structure to be an object of design comes into contact with the obstacle.

According to the above method, when it is determined that the predictive shape crosses the obstacle, the control point is returned to a position corresponding to a position immediately before the crossing and at least a crossing joint, which comes into contact with the obstacle model first, among crossing joints, which are joints crossing the obstacle model, is bound at a point of contact with the obstacle model immediately before the crossing. Therefore, it is possible to approximate the wire structure, which comes into contact with the obstacle and deforms, in a shape close to an actual shape and output the shape.

According to the above method, a predictive shape at the time when the binding in the joint binding step is released and the control point is displaced to the next position at the time of crossing is calculated. Therefore, it is possible to also accurately calculate a predictive shape in the case in which the wire structure crosses the obstacle once and, then, separates from the obstacle in accordance with the displacement of the point of contact and output the predictive shape.

According to the above method, a predictive shape at the time when a degree of freedom is given to a joint bound at the point of contact only in a tangential direction and the control point is displaced to the next position at the time of crossing is calculated. Therefore, it is possible to output a predictive shape further approximated to a state in which the wire structure to be an object of design comes into contact with the obstacle.

BRIEF DESCRIPTION OF THE DRAWINGS

The above objects and advantages of the present invention will become more apparent by describing in detail preferred exemplary embodiments thereof with reference to the accompanying drawings, wherein:

FIG. 2 is a diagram showing a relation between a representative support member, which is attached to a wire harness, and a degree of binding freedom;

FIGS. 10A to 10C are diagrams showing states in which the wire harness is deformed in the respective processing steps in FIG. 8.

DETAILED DESCRIPTION OF THE PREFERRED EMBODIMENTS

Figure 1:
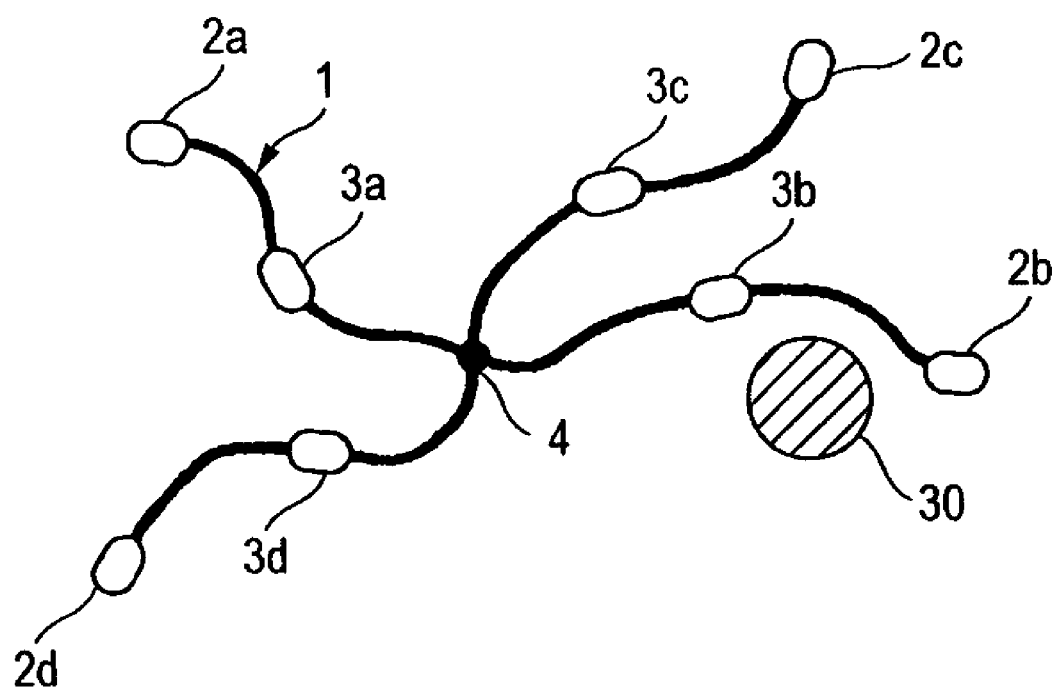
FIG. 1 is a diagram schematically showing an example of a wire harness to be an object of design.

The embodiments of the present invention will now be described on the basis of the drawings. First, an example of a wire harness as an object linear structure and a typical support member will be described in FIG. 1 and FIG. 2. FIG. 1 is a drawing schematically showing an example of an object wire harness. FIG. 2 is a diagram showing the relation between typical support members fixed to the wire harness and the degree of freedom of restrictions.

Connectors 2a, 2b, 2c, 2d for connecting electric parts (not shown) are mounted at both end portions of the wire harness 1. Various kinds of clips 3a, 3b, 3b, 3c are mounted to intermediate portions of the wire harness 1, which further has a branch point 4. Since the branch lines of the wire harness 1 have basically different number and kind of structural filament members, the thickness, length, elasticity, density and the like thereof are also different.

The connectors 2*a*, 2*b*, 2*c*, 2*d* are detachably joined to fixed portions and predetermined portions, which are in accordance with the part fixing direction, of connectors on the side of an electric part, and the end portions of the wire harness are thereby completely restricted. The clips 3*a*, 3*b*, 3*c*, 3*e* completely restrict or rotationally restrict predetermined portions of the wire harness with respect to predetermined portions of a body and a stay of a vehicle.

A description of the clips will now be added. The clips basically include an elongated hole clip, and a round hole clip. A round hole clip is also called a rotary clip, and has a base seat portion for retaining the wire harness, and a support leg inserted into a round fixing hole provided in a stay and the like. The round hole clip can be rotated around a Z-axis (perpendicular direction of a fixing portion).

The elongated hole clip is also called a fixed clip, and has a base seat portion for retaining the wire harness, and a support leg inserted into an elongated fixing hole provided in a stay and the like. This support leg has an elongated hole-like cross-sectional shape substantially identical with the cross-sectional shape of the fixing hole. The elongated hole clip is non-rotatable around the Z-axis.

The elongated hole clips and round hole clips include corrugated elongated hole clips rotatable around an X-axis (longitudinal direction of the wire harness), and corrugated round hole clips. The degrees of freedom of restriction in the axial directions and in the directions around the axes of such clips are as shown in FIG. 2.

Referring to FIG. 2, the X-axis, Y-axis and Z-axis correspond to three straight lines in a right-hand local coordinate system on joints (or called nodes as well) on the wire harness. For example, the Z-axis is set so that the Z-axis is in alignment with the clip axis. These setting methods can be changed suitably depending upon the functions in use. The drawing also shows for reference the degrees of freedom of restriction of the branch point. A joint, though it is not shown in the drawing, set arbitrarily on the portion of the wire harness which is other than the above-mentioned restriction point is basically completely free. Such a degree of freedom of restriction is set on each joint for making calculations of predictive paths which will be described later.

Figure 3A:
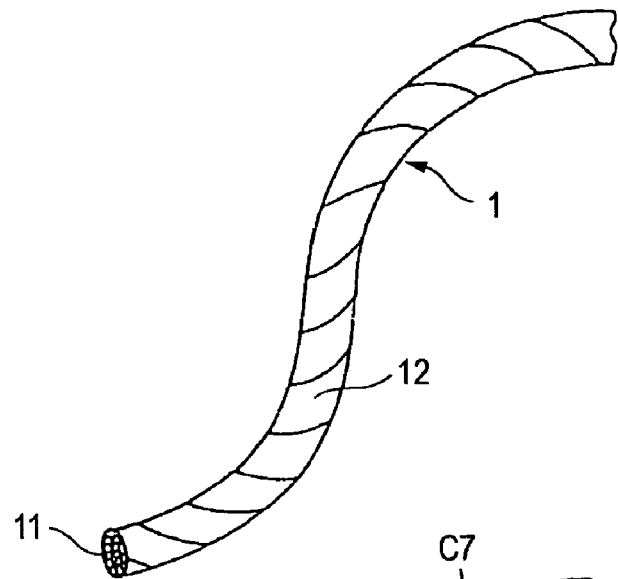
FIG. 3A is a diagram showing an external appearance of a wire harness.
Figure 3B:
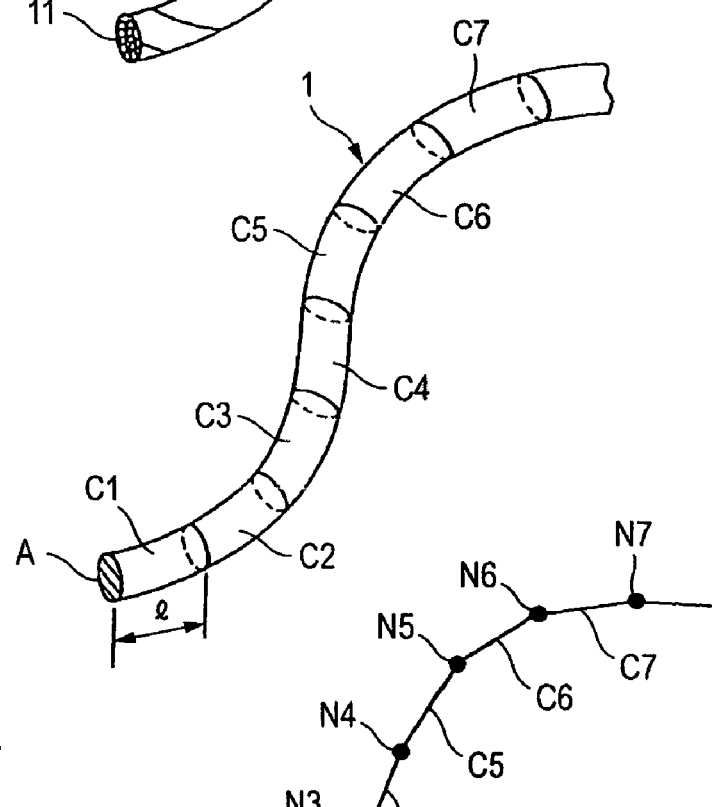
FIG. 3B is a diagram showing a state in which the wire harness in FIG. 3A is discretized.
Figure 3C:
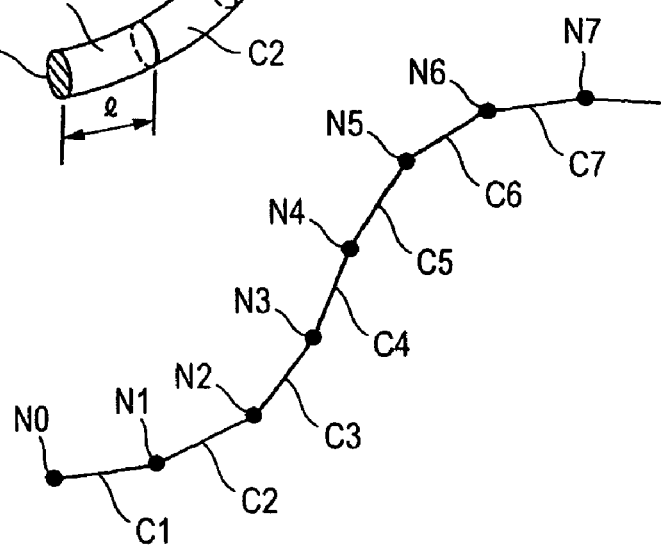
FIG. 3C is a diagram representing the wire harness in FIG. 3A with beam elements and joints.
Figure 4:
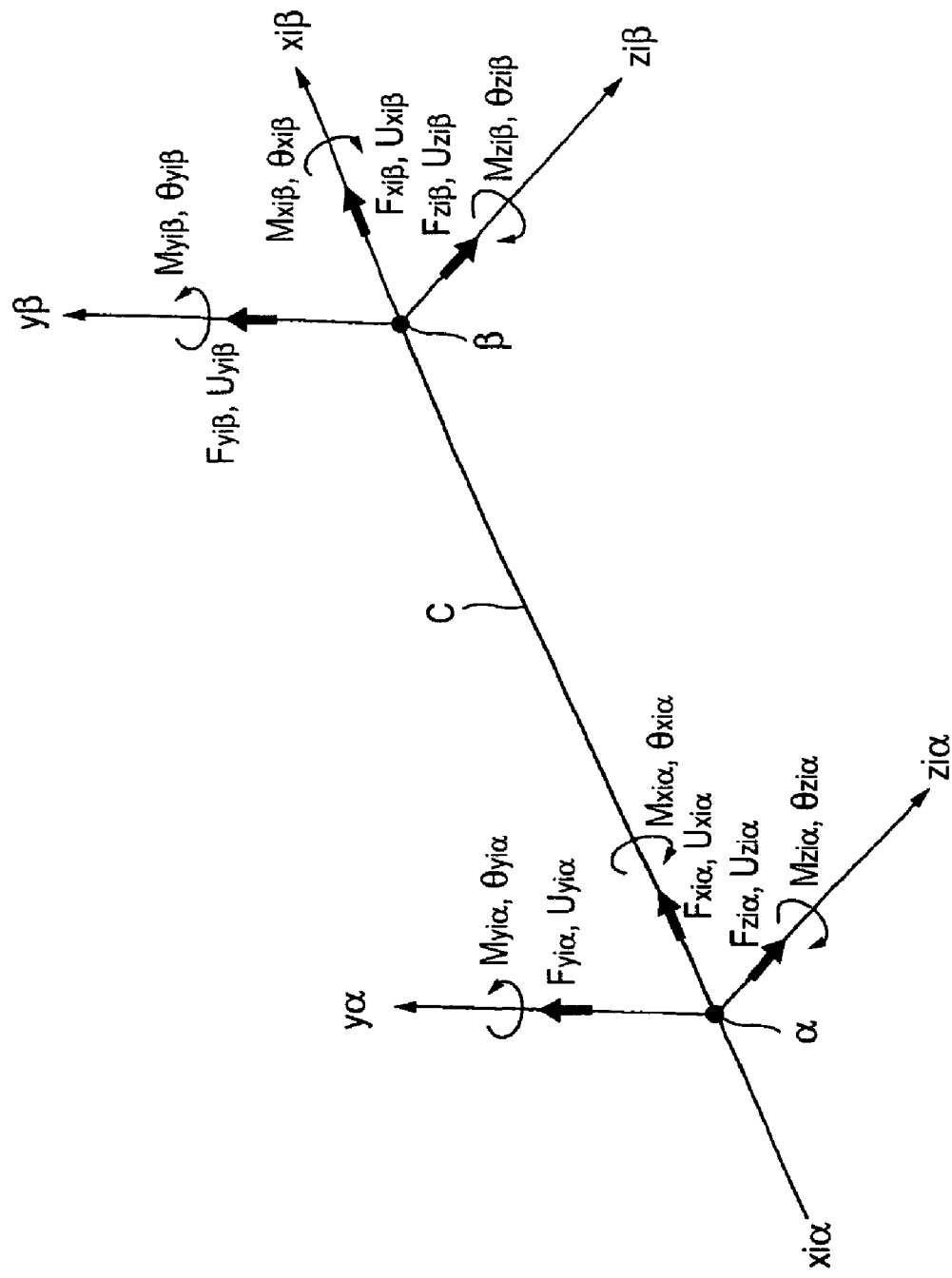
FIG. 4 is a diagram for explaining a degree of freedom in the wire harness represented by beam elements and joints.
Figures 5A, 5B:
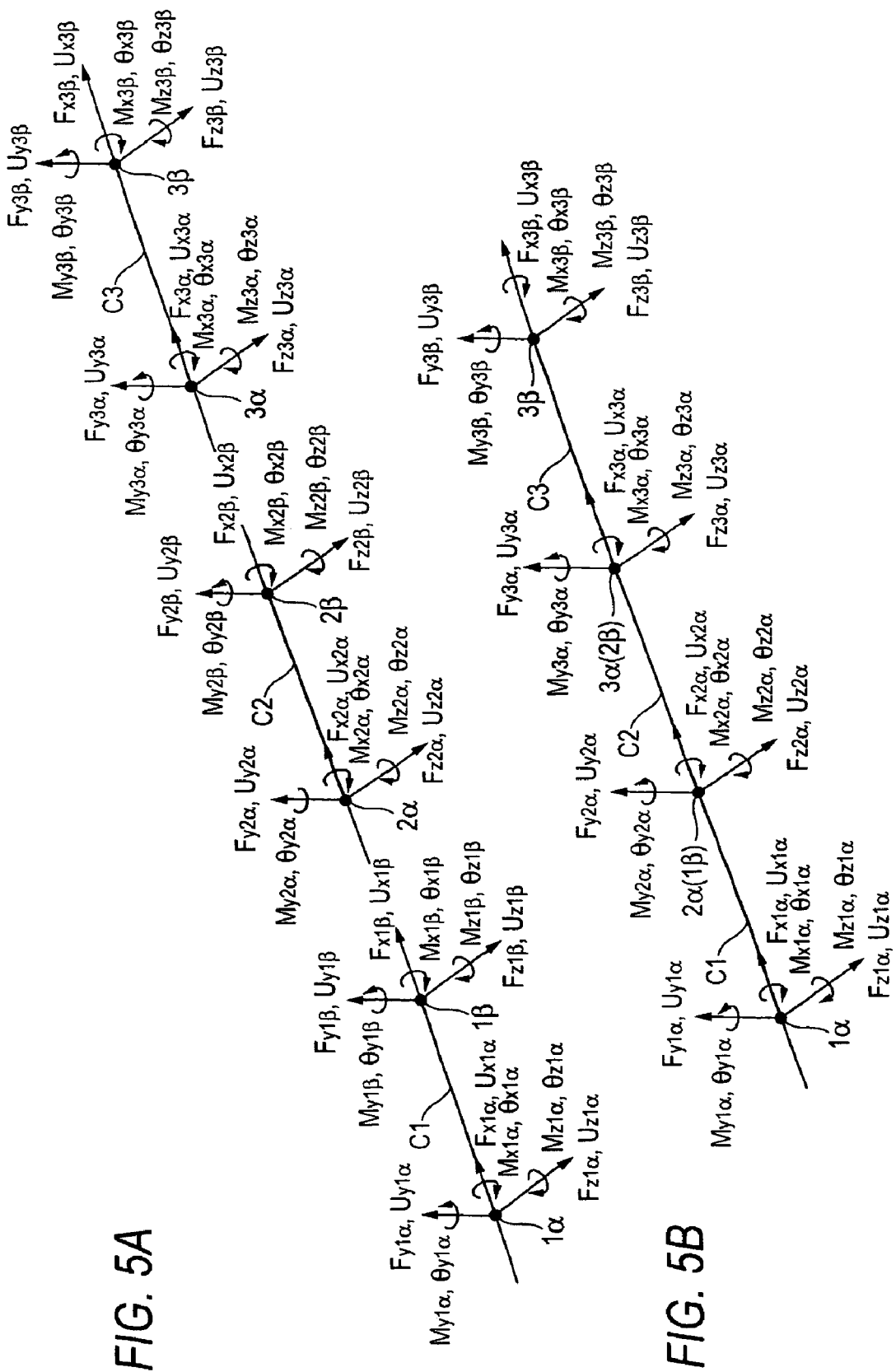
FIG. 5A is a diagram representing a wire harness with three beam elements.
FIG. 5B is a diagram showing a state in which the three beam elements in FIG. 5A are combined.

Referring then to FIG. 3 to FIG. 5, the outlines of the hypothetic conditions constituting the premises of the present invention, theories utilized and basic equations will now be described. FIG. 3A is a drawing showing an external view of a wire harness, FIG. 3B a drawing showing a discrete condition of the wire harness of FIG. 3A, and FIG. 3C a drawing representing the wire harness of FIG. 3A by beam elements and joints. FIG. 4 is a drawing for describing the degree of freedom in the wire harness represented by beam elements and joints. FIG. 5A is a drawing representing the wire harness by three beam elements, and FIG. 5B a drawing showing the condition of the three beam elements of FIG. 5A combined together.

First, according to the present invention, the following hypotheses are built up under use of the finite element process for designing the wire harness.
(1) It is assumed that the wire harness is made of an elastic body.
(2) It is assumed that the wire harness is a combination of beam elements.
(3) It is assumed that each beam element retains the linearity.

Setting the wire harness hypothetically as beam elements means that the wire harness is also set hypothetically as a uniform cross section, i.e. a homogeneous cross section. The cross section is assumed to be circular but it is not always necessary to assume the cross section in this manner. However, in the following statement, a description will be given with the cross section of the wire harness assumed to be circular.

When such a hypothesis is formed, the applying of the finite element process to the wire harness, which has not heretofore been applied thereto, becomes possible.

First, the wire harness is discretized. The wire harness formed by binding a plurality of electric wires 11 by an armoring material, such as a tape 12 as shown in FIG. 3A can be regarded as a continuous body. As shown in FIG. 3B, such a wire harness 1 is divided (discretized) into some beam elements C1, C2, C3, . . . . Namely, the wire harness is like one rope, so that the wire harness can be regarded as finite pieces of connected beam elements.

Therefore, as shown in FIG. 3C, the wire harness can be expressed as a combination of a plurality of beam elements C1, C2, C3, . . . connected to one another by a plurality of nodes N1, N2, N3, . . . . The characteristic values necessary for the beam elements are as follows.

Length I (refer to FIG. 3B)
Cross-sectional area A (refer to FIG. 3B)
Second moment of area I
Second polar moment of area J (also called torsional resistance coefficient)
Longitudinal elastic modulus E
Lateral elastic modulus G In order to determine these values, a density $\rho$ and a Poisson's ratio $\mu$, etc. are also used, though they are not directly shown in these characteristic values.

In the specification of the present invention, the parameters concerning the physical properties directly determining an outer shape of a linear structure are called outer shape parameters, and the parameters concerning the physical properties other than the outer shape parameters, such as the second moment of area 1, polar moment of area J, longitudinal elastic modulus E and lateral elastic modulus G, density $\rho$, Poisson's ratio $\mu$, etc. shall be called non-outer shape parameters.

As shown in FIG. 4, each beam element (C1, C2, C3, . . . ) has two nodes $\alpha$ and $\beta$. In the three-dimensional space, the node $\alpha$ has three translational components and three rotational components, so that the node has a total of six degrees of freedom. The same applies to the other node $\beta$. Therefore, the beam element C necessarily has twelve degrees of freedom.

Referring to the drawing, the following reference letters and symbols represent:

$F_{xi}$: Nodal force in an xi axial direction of i-th element
$F_{yi}$: Nodal force in a yi axial direction of i-th element
$F_{zi}$: Nodal force in a zi axial direction of i-th element
$M_{xi}$: End moment around the xi axis of the i-th element (the right-handed screwing direction shall be a positive direction)
$M_{yi}$: End moment around the yi axis of the i-th element (the right-handed screwing direction shall be a positive direction)
$M_{zi}$: End moment around the zi axis of the i-th element (the right-handed screwing direction shall be a positive direction)
$U_{xi}$: Displacement in the xi direction of the i-th element
$U_{yi}$: Displacement in the yi direction of the i-th element
$U_{zi}$: Displacement in the zi direction of the i-th element $\Theta_{xi}$: Angular displacement around the xi axis of the i-th element (the right-handed screwing direction shall be a positive direction)

$\Theta_{yi}$: Angular displacement around the yi axis of the i-th element (the right-handed screwing direction shall be a positive direction)

$\Theta_{zi}$: Angular displacement around the zi axis of the i-th element (the right-handed screwing direction shall be a positive direction)

α represents a left side node, and the other β a right side node.

In the structural mechanics accompanying such a large deformation as that of a wire harness and the like, a balance equation of a finite element process is generally $$([K]+[K_G])\{x\}=\{F\} \tag{1}$$

$$\begin{pmatrix} \frac{AE}{l} & 0 & 0 & 0 & 0 & 0 & -\frac{AE}{l} & 0 & 0 & 0 & 0 & 0 \\ 0 & \frac{12EI_z}{l^3} & 0 & 0 & 0 & \frac{6EI_z}{l^2} & 0 & -\frac{12EI_z}{l^3} & 0 & 0 & 0 & \frac{6EI_z}{l^2} \\ 0 & 0 & \frac{12EI_y}{l^3} & 0 & -\frac{6EI_y}{l^2} & 0 & 0 & 0 & -\frac{12EI_y}{l^3} & 0 & -\frac{6EI_y}{l^2} & 0 \\ 0 & 0 & 0 & \frac{GJ}{l} & 0 & 0 & 0 & 0 & 0 & -\frac{GJ}{l} & 0 & 0 \\ 0 & 0 & -\frac{6EI_y}{l^2} & 0 & \frac{4EI_y}{l} & 0 & 0 & 0 & \frac{6EI_y}{l^2} & 0 & \frac{2EI_y}{l} & 0 \\ 0 & \frac{6EI_z}{l^2} & 0 & 0 & 0 & \frac{4EI_z}{l} & 0 & -\frac{6EI_z}{l^2} & 0 & 0 & 0 & \frac{2EI_z}{l} \\ -\frac{AE}{l} & 0 & 0 & 0 & 0 & 0 & \frac{AE}{l} & 0 & 0 & 0 & 0 & 0 \\ 0 & -\frac{12EI_z}{l^3} & 0 & 0 & 0 & -\frac{6EI_z}{l^2} & 0 & \frac{12EI_z}{l^3} & 0 & 0 & 0 & -\frac{6EI_z}{l^2} \\ 0 & 0 & -\frac{12EI_y}{l^3} & 0 & \frac{6EI_y}{l^2} & 0 & 0 & 0 & \frac{12EI_y}{l^3} & 0 & \frac{6EI_y}{l^2} & 0 \\ 0 & 0 & 0 & -\frac{GJ}{l} & 0 & 0 & 0 & 0 & 0 & \frac{GJ}{l} & 0 & 0 \\ 0 & 0 & -\frac{6EI_y}{l^2} & 0 & \frac{2EI_y}{l} & 0 & 0 & 0 & \frac{6EI_y}{l^2} & 0 & \frac{4EI_y}{l} & 0 \\ 0 & \frac{6EI_z}{l^2} & 0 & 0 & 0 & \frac{2EI_z}{l} & 0 & -\frac{6EI_z}{l^2} & 0 & 0 & 0 & \frac{4EI_z}{l} \end{pmatrix} \begin{Bmatrix} U_{xi\alpha} \\ U_{yi\alpha} \\ U_{zi\alpha} \\ \theta_{xi\alpha} \\ \theta_{yi\alpha} \\ \theta_{zi\alpha} \\ U_{xi\beta} \\ U_{yi\beta} \\ U_{zi\beta} \\ \theta_{xi\beta} \\ \theta_{yi\beta} \\ \theta_{zi\beta} \end{Bmatrix} = \begin{Bmatrix} F_{xi\alpha} \\ F_{yi\alpha} \\ F_{zi\alpha} \\ M_{xi\alpha} \\ M_{yi\alpha} \\ M_{zi\alpha} \\ F_{xi\beta} \\ F_{yi\beta} \\ F_{zi\beta} \\ M_{xi\beta} \\ M_{yi\beta} \\ M_{zi\beta} \end{Bmatrix} \tag{2}$$

wherein [K] is a general rigidity matrix, [$K_G$] an overall geometric rigidity matrix, {x} a displacement vector, and {F} a load vector (also called a force vector).

However, since the equation (1) is algebraically a non-linear simultaneous equation, the equation cannot be solved as it is in a practical numerical analysis. Therefore, an incremental method in which a load value is fractionized and gradually added is necessarily employed (the same applies to a case where forced displacement occurs). In consequence, the balance equation (1) is also expressed by the following incremental system.

$$([K]+[K_G])\{\Delta x\}=\{\Delta F\}-\{R\} \tag{1}'$$

wherein {ΔF} is a value of load increment, {Δx} incremental deformation in an incremental step, and {R} a correction vector for a load vector.

In each incremental section, calculations are made with the balance equation regarded as a linear equation, and a balancing force ((vector {R} in the equation (1)')) occurring during this time is reduced to a level in a tolerance by a method of repetition before a subsequent step is taken. In a series of these algorithms, a known method, for example, a Newton-Raphson method and an arc length method are utilized.

When a forced displacement is designated as in the prediction of a shape, omitting the overall geometric rigidity matrix [$K_G$] in a second item out of a left side of the balance equation, the results of a good quality are obtained in many cases. The overall geometric rigidity matrix is omitted in this case as well.

The overall rigidity matrix [K] in a first item of a left side of the balance equation is obtained by converting the rigidity matrix of each element, which is rewritten as the coordinate value is changed momentarily in each incremental step, into a coordinate value in an overall coordinate system, and aggregating the values thus obtained. The concrete content of expression of the element rigidity matrix forming a basis is shown in the following equation (2).

The condition of compatibility and that of equilibrium will now be described. As shown in FIG. 5A, the wire harness shall be expressed by three beam elements C1, C2, C3 for simplicity's sake. In this case, the quantity of displacement of a node 1β of the beam element C1 and that of displacement of a node 2α of the beam element C2 become equal, and a force applied to these two nodes is also balanced. For the same reason, the quantities of displacement of the node 2β of the beam element C2 and node 3α of a beam element C3 also become equal, and a force applied to these two nodes is also balanced. Therefore, owing to the continuity of the displacement and the satisfaction of the condition of equilibrium, the beam elements C1 and C2, and the beam elements C2 and C3 can be combined with each other as shown in FIG. 5B.

Referring to the drawings, the following reference letters and symbols represent:

$F_{xi}$: Nodal force in the xi axial direction of the i-th element $F_{yi}$: Nodal force in the yi axial direction of the i-th element $F_{zi}$: Nodal force in the zi axial direction of the i-th element $M_{xi}$: End moment around the xi axis of the i-th element $M_{yi}$: End moment around the yi axis of the i-th element $M_{zi}$: End moment around the zi axis of the i-th element $U_{xi}$: Displacement in the xi axial direction of the i-th element $U_{yi}$: Displacement in the yi axial direction of the i-th element $U_{zi}$: Displacement in the zi axial direction of the i-th element $\Theta_{xi}$: Angular displacement around the xi axis of the i-th element $\Theta_{yi}$: Angular displacement around the yi axis of the i-th element $\Theta_{zi}$: Angular displacement around the zi axis of the i-th element wherein i=1α, 1β, 2α, 2β, 3α, and 3β.

When the continuity of the displacement and the balance of force in the beam elements C1, C2 and C3 shown in FIG. 5B are shown in the same form as the above-mentioned equation (2), the following equation (3) is obtained.

moment and so forth can be calculated by determining a force vector {F} in each node. The general matrix finite element process as mentioned above is also introduced in, for example, the above-mentioned in the publication "Matrix Finite element process".

Figure 6A:
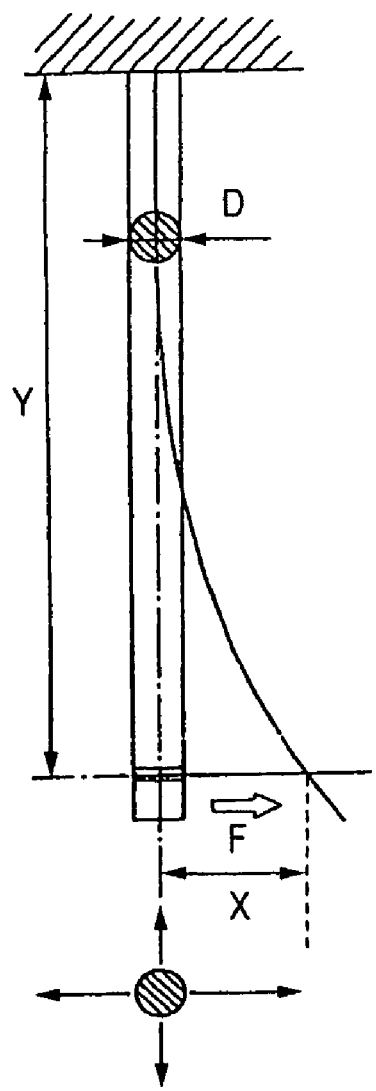
FIG. 6A is a diagram showing a state in which a geometrical moment of inertia and a modulus of longitudinal elasticity are measured.

One example of the method of determining a Poisson's ratio, a longitudinal elastic modulus and a lateral elastic modulus which are necessary for the prediction of the shape in the present invention will now be described below. FIG. 6A is a drawing showing the measurement of geometrical moment of inertia and a longitudinal elastic modulus, and FIG. 6B a drawing showing the measurement of a polar moment of area and a lateral elastic modulus.

First, an object wire harness is prepared, and the length l, a cross-sectional area A and a density ρ are determined with

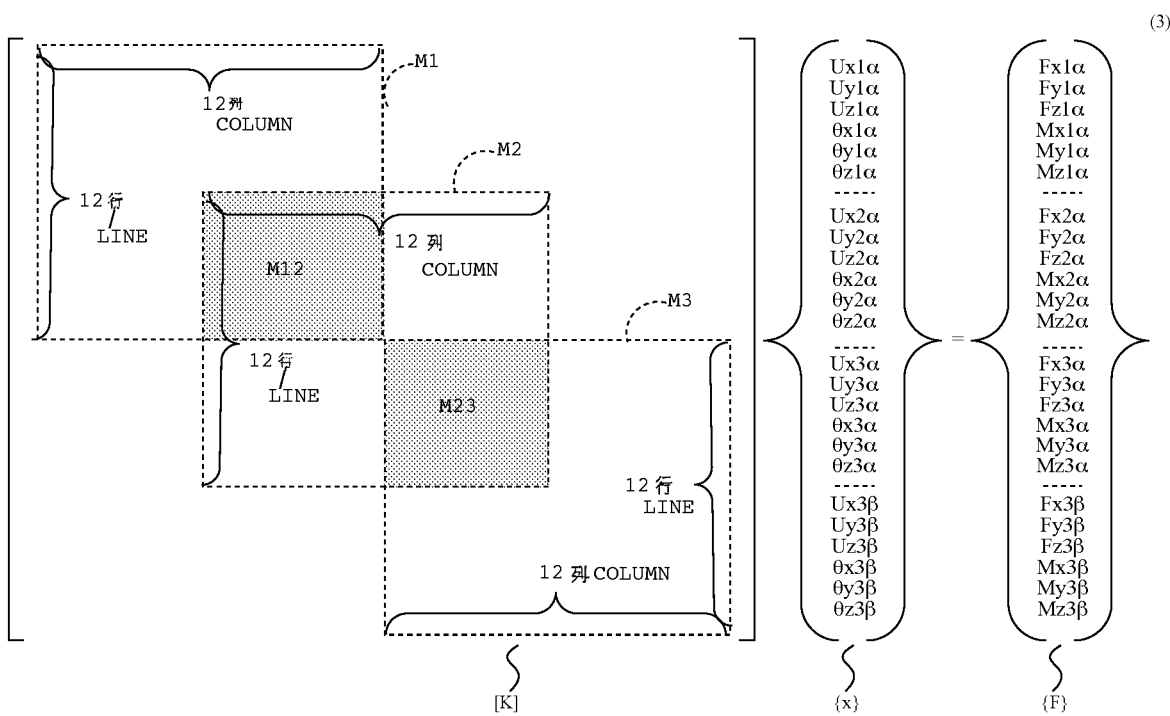

The matrixes M1, M2 and M3 on a line 12 and a column 12 in the equation (3) are the same as that shown in the above equation (2). However, the portions M12 and M23 in which the matrixes M1, M2 and M3 overlap each other are portions in which the structural elements of the matrixes are summed up.

Not smaller than four beam elements can also be handled in the same manner. Thus, a mathematical model of a wire harness divided into an arbitrary number of beam elements can be made. When the above equation (3) is expressed simply, it becomes $$[K]\{x\}=\{F\} \quad (4)$$

Therefore, a path, i.e. a predictive shape of the wire harness can be calculated by determining each element of the displacement vector {x} on the basis of the above equations (3) and (4). The distortion, stress, a reaction force, calipers, a measure, a gravimeter and the like. The values can then be obtained by simple calculations.

When the longitudinal elastic modulus E is measured by using the measuring method shown in FIG. 6A, the result can be expressed by the following equation (5).

$$E=FL^3/3XI \quad (5)$$

The geometrical moment of inertia can be expressed by the following equation (6) since it was assumed that the wire harness had a circular cross section as mentioned above.

$$I=\pi D^4/64 \quad (6)$$

Therefore, the equation becomes:

$$E=64FL^3/3X\pi D^4 \quad (7)$$

In this measurement, the longitudinal elastic modulus E can be determined by measuring the relation between F and x with $E=(F/X)\times(64L^3/3\pi D^4)$.

Figure 6B:
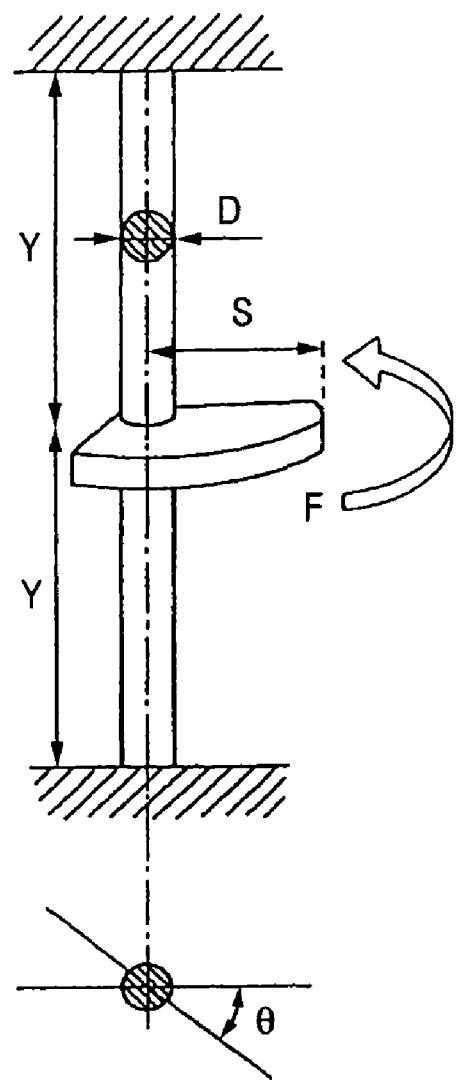
FIG. 6B is a diagram showing a state in which a polar moment of inertia of area and a modulus of transverse elasticity are measured.

When the lateral elastic modulus G is determined by using the measuring method shown in FIG. 6B, the result can be expressed by the following equation (8).

$$G = (TL/\Theta J) \times 2 \quad (8)$$

The polar moment of area J can be expressed by the following equation (9) since it was assumed that the wire harness had a circular cross section.

$$J = \pi D^4 / 32 \quad (9)$$

The torsional force becomes:

$$T = FS \quad (10)$$

Therefore, $$G = (32FSL/\Theta \pi D^4) \times 2 = (F/\Theta)(32SL/\pi D^4) \times 2 \quad (11)$$

Accordingly, the lateral elastic modulus G can be determined by measuring the relation between F and $\Theta$.

The lateral elastic modulus and longitudinal elastic modulus have the relation shown by the following equation (12).

$$G = E/2(1+\mu) \quad (12)$$

wherein $\mu$ is a Poisson's ratio.

The above-mentioned measuring method is an example, and each of the lateral elastic modulus G and longitudinal elastic modulus E may also be obtained by a method other than this example of the measuring method.

Figure 7:
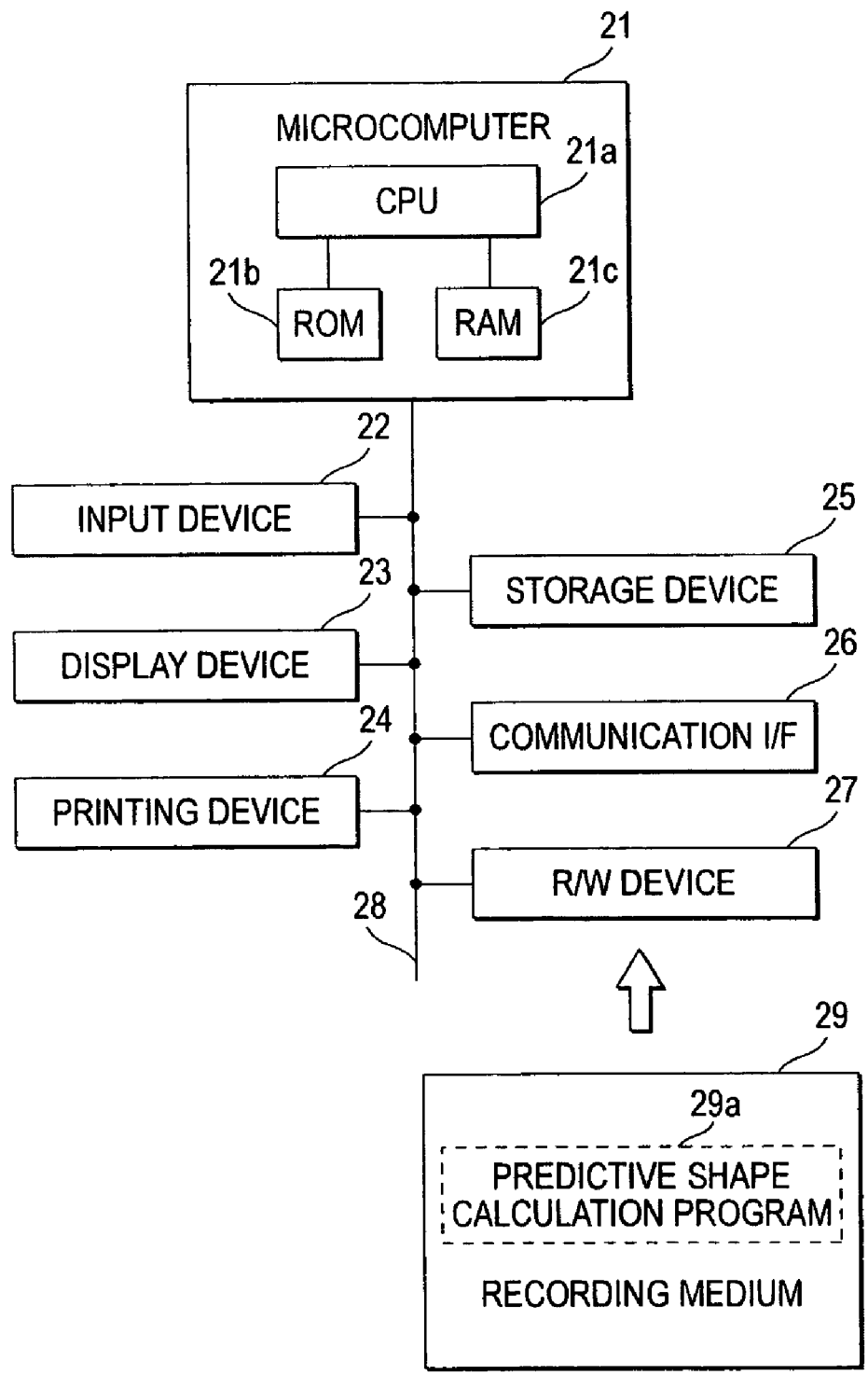
FIG. 7 is a block diagram showing an example of a hardware configuration according to an embodiment of the invention.

The supporting of the design is then done by calculating a predictive shape of the wire harness in accordance with a processing procedure, which will be described later, by utilizing the above theory, basic equations and measurement values. The construction of the hardware in the present invention will be described. FIG. 7 is a block diagram showing the construction of the hardware in all of the modes of embodiments of the present invention.

As shown in FIG. 7, the apparatus according to the present invention includes a microcomputer 21, an input unit 22, a display 23, a printing unit 24, a storage 25, a communication interface 26 and a read/write unit 27. For example, a personal computer is used. Needless to say, a desk top computer and a supercomputer which are other than the personal computer may also be used. The microcomputer 21 includes a CPU 21a (Central Processing Unit), a ROM 21b for storing a boot program, etc., and a RAM 21c for temporarily storing the results of various kinds of processing operations. The input unit 22 is a keyboard, a mouse and the like for inputting the mentioned various values thereinto, the display 23 is a LCD, a CRT and the like for displaying the results of processing operations, and the printing unit 24 a printer for printing the results of processing operations.

The storage 25 stores an installed predictive shape calculation program 29a, i.e. a hard disk drive for storing the results of a process based on this program 29a, while the communication interface 26 is a modem board and the like for making data communication between the communication interface and an external unit by using, for example, internet and a LAN circuit and the like. The read/write unit 27 is a device for reading the predictive shape calculation program 29a stored in a recording medium 29, such as a CD and a DVD, and write the calculation results based on this predictive shape calculation program 29a in the recording medium 29. These structural elements are connected together via an inner bus 28.

The microcomputer 21 installs the predictive shape calculation program 29a, which is read by the read write device 27, in the storage 25. When a power supply is turned on, the microcomputer 21 is started in accordance with the boot program stored in the ROM 21b and boots the installed predictive shape calculation program 29a. Then, in accordance with the predictive shape calculation program 29a, the microcomputer 21 performs processing for shape prediction taking into account an obstacle, causes the display device 23 and the printing device 24 to output results of the processing, and causes the storage 25 and the recording medium 29 to stores the results of the processing. The predictive shape calculation program 29a can be installed in other personal computers and the like having the basic structure described above. After the installation, the predictive shape calculation program 29a causes the computers as wiring design support apparatuses. Note that the predictive shape calculation program 29a is not limited to the recording medium 29 but may be a program provided through a communication line such as the Internet or a LAN.

Figure 8:
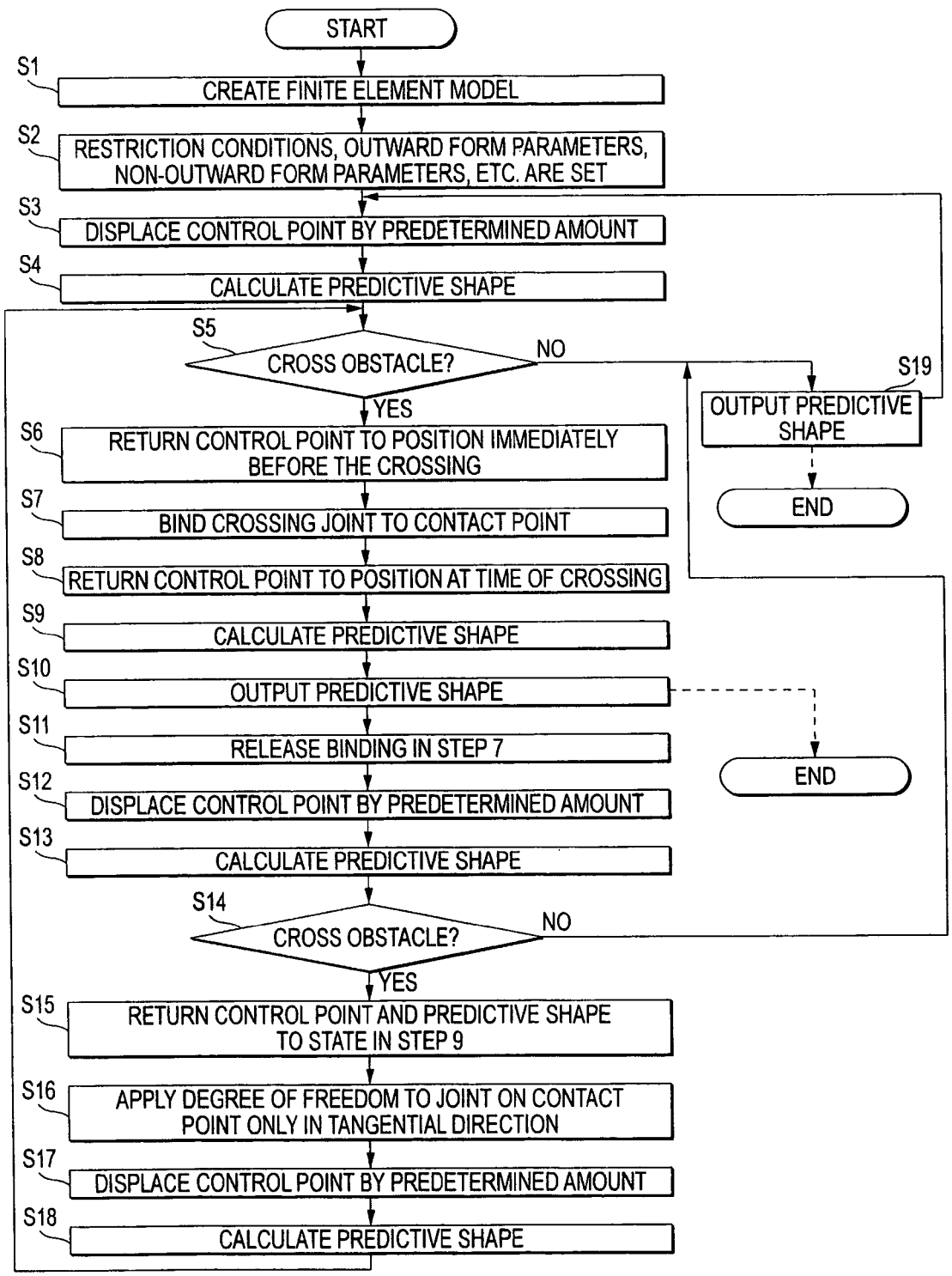
FIG. 8 is a flowchart showing a processing procedure according to the embodiment of the invention.

A processing procedure according to an embodiment of the invention will be explained using FIGS. 8, 9, and 10. FIG. 8 is a flowchart showing the processing procedure according to the embodiment of the invention. FIGS. 9A to 9D and FIGS. 10A to 10C are diagrams showing a state in which a wire harness deforms in respective processing steps in FIG. 8.

Figure 9A:
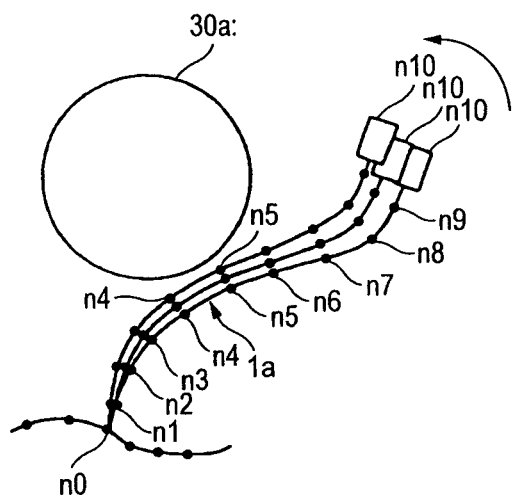
FIGS. 9A to 9D are diagrams showing states in which a wire harness is deformed in respective processing steps in FIG. 8.

First, in step S1 shown in FIG. 8, a finite element model 1a corresponding to the wire harness to be an object of design is created as shown in FIG. 9A using the process described above. This finite element model 1a includes plural beam elements having n0 to n10 as joints. Note that it is assumed that the respective joints are allocated at equal intervals. An obstacle model 30a corresponding to an outward form of a pertinent obstacle is also created together with the finite element model 1a. Step S1 corresponds to a finite element model creating process and a finite element model creating unit.

Next, in step S2, restriction conditions, outward form parameters, non-outward form parameters, and the like of the wire harness to be an object of design are set.

As the restriction conditions, restriction types (completely restriction, rotationally restriction, completely free, etc.) shown in FIG. 2, coordinates, and the like are set for the respective joints n0 to n10 of the finite element model 1a. Specifically, a type of a restriction condition of the joints n0 and n10 corresponding to a fixed point and a control point, respectively, is set as completely restriction and a type of a restriction condition of the other joints n2 to n9 is set as completely free. However, it is assumed that the joint n10 corresponding to the control point is sequentially subjected to forced displacement. The joint n10 corresponds to, for example, a section to which a connector or the like is attached and which is displaced while being held by a worker. The respective values set here relate to the respective elements in the displacement vector {x} in the expression (3).

As the outward form parameters, the length l and the sectional area A are set, respectively. As the non-outward form parameters, the geometrical moment of inertia I, the polar moment of inertia of area J, the Poisson's ratio $\mu$, the density $\rho$, the modulus of longitudinal elasticity E, and the modulus of transverse elasticity G are set, respectively.

The values measured or calculated in advance as described above are used as the parameters. The values set here relate to the respective elements in the rigidity matrix [K] in expression (3). The outward form parameters and the non-outward form parameters correspond to physical properties. Note that, although not shown in the figure, various control values and the like related to this calculation are also set.

Note that, at this stage, it is assumed that the joint n10 corresponding to the control point (hereinafter simply referred to as control point n10 as well) is in a position corresponding to an initial shape. As the initial shape, a predictive shape, which is a state in which the finite element model is physically balanced, corresponding to the set values described above, that is, a shape indicated by 1a in FIG. 9A is calculated. It is preferable to set a shape close to an actual shape as the initial shape.

For example, when a wire harness is delivered from a wire harness manufacturer to a car manufacturer, the wire harness is packed in a container and delivered. However, when the wire harness taken out from the container is cabled to a vehicle, an initial shape changes depending on how the wire harness is bent in the container. It is possible to calculate an initial state further conforming to a reality by reflecting such a bent initial shape on a predictive shape as a start point.

Note that, in order to calculate an initial state, it is not always necessary to use the finite element process. For example, a minimum bend radius depending on a material characteristic of the wire harness, a bend radius at which a worker can bend with an ordinary force when the wire harness is assembled, and the like may be used. In any case, it is preferable to set an initial state on which a shape before assembly of the wire harness to be an object of design is reflected.

Next, in step S3, the control point n10 is forcibly displaced by a predetermined amount. In step S4, a predictive shape corresponding to a position of the control point n10 is calculated. In this case, the values as set in step S2 are adopted as other restriction conditions, outward form parameters, and non-outward form parameters. The predictive shape is a predictive shape representing a state in which a finite element model is physically balanced.

Figure 9B:
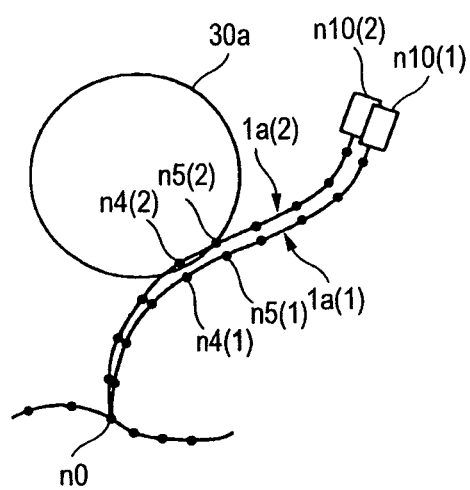

Next, in step S5, it is judged whether the predictive shape 1a crosses the obstacle model 30a. When it is judged in step S5 that the predictive shape 1a crosses the obstacle model 30a (Y in step S5), the processing proceeds to steps S6 and S7. FIG. 9B indicates that the predictive shape 1a(1) crosses the obstacle model 30a because the control point is displaced from n10(1) to n10(2). In the figure, 1a(1), n10(1), n4(1), and n5(1) indicate the predictive shape 1a, and the control point n10, the joints n4 and n5 immediately before the crossing. 1a(2), n10(2), n4(2), and n5(2) indicate the predictive shape 1a, the control point n10, and the joints n4 and n5 immediately after crossing. Step S5 corresponds to a crossing determining process and a crossing determining unit.

Note that, in step S5, when it is judged that the predictive shape 1a does not cross the obstacle model 30a (N in step S5), the processing proceeds to step S19 and the calculated predictive shape is output to the display device 23. At the same time, the obstacle model 30a is also output. After that, the predictive shape and the obstacle model 30a are also output simultaneously. It is preferable that the predictive shape is output not only to the display device 23 but also to the printing device 24 or is recorded in the recording medium 29. It is preferable that an output image is obtained by adding a thickness of the wire harness and a shape of a clamp to the predictive shape 1a of FIG. 9A.

The processing in steps S3, S4, S5, and S19 is repeated as long as a predictive shape does not cross the obstacle model 30a (N in step S5) and the control point n10 does not reach a target point. As a result, for example, as shown in FIG. 9A, the predictive shape 1a, which deforms as the control point n10 is displaced in a direction indicated by an arrow, is output. However, when the control point n10 reaches the target point, after step S19 ends, the series of processing is terminated.

Figure 9C:
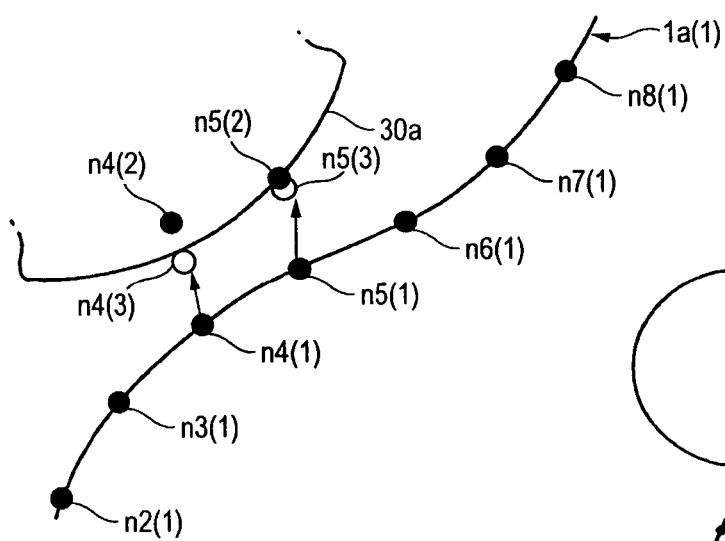

In step S6, a control point n10(2) is returned to a position of a control point n10(1) corresponding to a position immediately before the crossing. In step S7, as shown in FIG. 9C, crossing joints n4(2) and n5(2), which are joints crossing the obstacle model 30a, are forcibly bound at points of contact n4(3) and n5(3) with the obstacle model 30a. The points of contact n4(3) and n5(3) are, for example, points where the joints n4 and n5 pass immediately before the crossing the obstacle model 30a.

As described above, instead of forcibly binding both the crossing joints n4(2) and n5(2) to the points of contact n4(3) and n5(3), at least one of crossing joints may be forcibly bound at a point of contact. For example, in the example described above, the point n4(2), which is a joint coming into contact with the obstacle model 30a first or a joint crossing the obstacle model 30a most deeply, may be forcibly bound at the point of contact n4(3). In other words, actually, since a point of contact with the obstacle model 30a is one in many cases, it is possible to approximate a predictive shape more closely to an actual shape in this way.

Figure 9D:
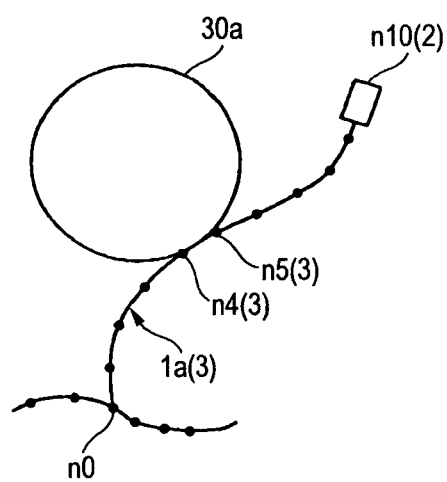

Next, in step S8, the control point n10(1) is returned to the position of the control point n10(2) at the time of crossing. In step S9, as shown in FIG. 9D, a predictive shape 1a(3) at this point is calculated in the same process as described above. Then, in step S10, the calculated predictive shape 1a(3) is output to the display device 23. At the same time, the obstacle model 30a is also output. However, when the control point n10 reaches the target point, the series of processing ends after step S10 is terminated. Steps S6 and S7 correspond to a joint binding process and a joint binding unit.

Next, in step S11, the binding (restriction) given to the joints n4 and n5 in step S7 is released. In step S12, as shown in FIG. 10A, the control point n10(2) is displaced to a control point n10(3) in the next position. In step S13, a predictive shape 1a(5) at this point is calculated by the same process as described above. In FIG. 10A, n(4) and n5(4) indicates the joints n4 and n5, binding of which is released, and 1a(4) indicates a predictive shape at this point. Then, in step S14, it is judged whether 1a(4), binding of which is released, crosses the obstacle model 30a. Note that step S11 corresponds to a binding releasing step and a binding releasing unit. Steps S4, S9, and S13 correspond to a predictive shape calculating process and a predictive shape calculating unit. Steps S11 to S13 correspond to a second predictive shape calculating process.

In step S14, when it is judged that the predictive shape 1a(4) crosses the obstacle model 30a (Y in step S14), the processing proceeds to steps S15 to S18. When it is judged that the predictive shape 1a(4) does not cross the obstacle model 30a (N in step S14), the processing returns to step S19 and the processing described above is repeated.

In step S15, the control point and the predictive shape are returned to the state in step S9 once. In other words the control point n10(3) and the predictive shape 1a(4) shown in FIG. 10A are returned to the control point n10(2) and the predictive shape 1a(3) shown in FIG. 9D, respectively.

Next, in step S16, as indicated by an arrow in FIG. 10B, a degree of freedom is given to the joints n4 and n5 bound at the point of contacts n4(4) and n5(4) only in a tangential direction. In step S17, as shown in FIG. 10C, the present control point n10(2) is displaced to the control point n10(3) of the next position (the same position as in step S12) again. In step S18, the predictive shape 1a(4) at this point is calculated by the same process as described above. In FIGS. 10B and 10C, n4(4) and n5(4) indicates joints to which a degree of freedom is given in a tangential direction and 1a(4) indicates a predicted state at this point. Steps S16 to S18 correspond to a third predictive shape calculating step.

Then, the processing returns to step S5 and it is judged whether the predictive shape 1a(4) calculated in step S18 crosses the obstacle model 30a. Note that, in the judgment on crossing at this point, it is judges whether joints other than the joints n4(4) and n5(4), to which a degree of freedom is given in the tangential direction, cross the obstacle model 30a anew. If there is a joint crossing the obstacle model 30a anew, the processing in step S7 and subsequent steps is repeated. Such processing is repeated until it is judged that the control point n10 reaches the target point.

The processing in steps S11 to S14 may be performed at a stage different from the stage given as an example above. For example, the processing in steps S11 to S14 may be performed after the processing in steps S15 to S18. However, in this case, again, the processing in steps S11 to S14 is performed after the control point and the predictive shape are returned to the state in step S9.

As described above, according to the embodiment of the invention, it is possible to output a predictive shape of a wire structure such as a wire harness, which comes into contact with an obstacle and deforms, approximately. Therefore, the invention is extremely effective for optimum wiring of the wire structure.

Note that an example of calculation of shape prediction according to forced displacement is described in the embodiment. However, the invention is also applicable to shape prediction in deforming a wire structure while applying a force to a predetermined joint.

A wire harness, which is wired in a vehicle as a wire structure, has been explained as an example. However, it is needless to mention that the invention is applicable to not only such a wire harness but also a hose and a tube, which have structures simpler than that of the wire harness and are wired outside a vehicle, a general electric wire or one string of electric wire, and the like. In other words, the wire structure in the invention includes the hose, the tube, the general electric wire, the one string of electric wire, and the like. The invention is applicable not only to a wire structure with a circular section but also to wire structures with a rectangular section, an annular section, an elliptical section, an H-shaped section, and the like. In other words, the wire structure, to which the present invention is applied, is not limited to a wire structure with a circular section.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2004-151759 filed on May 21, 2004, the contents of which are incorporated herein for reference.

What is claimed is:

1. A method of calculating a predictive shape of a wire structure, comprising of:
providing a finite element model of the wire structure, the finite element model being formed as an elastic body having a plurality of linearity beam elements combined at respective joints;
setting physical properties and restriction conditions of the wire structure to the finite element model;
calculating a predictive shape of the finite element model which is in a physically balanced condition based on the physical properties and the restriction conditions;
determining whether the predictive shape of the finite element model crosses an obstacle model representing an obstacle when a control point of the wire structure is displaced;
returning the control point of the finite element model to a position corresponding to a position immediately before the crossing of the joint with the obstacle model, and binding a crossing joint which is the joint crossing with the obstacle model, to a contact point of the finite element model with the obstacle model, when it is determined that the predictive shape crosses the obstacle model; and
outputting the predictive shape at the time when the control point is returned to a position of the crossing while maintaining the binding.

2. The method as set forth in claim 1, wherein, in the process of binding the crossing joint, the crossing joint is at least one of a crossing joint which comes into contact with the obstacle model first and a crossing joint which crosses the obstacle model most deeply, among crossing joints.

3. A computer-readable recording medium for causing a computer to execute the method of calculating a predictive shape of a wire structure set forth in claim 2.

4. The method as set forth in claim 1, further comprising of:
calculating a predictive shape of the finite element model at the time when the binding of the crossing joint is released and the control point is displaced to the next position at the time of the crossing.

5. A computer-readable recording medium for causing a computer to execute the method of calculating a predictive shape of a wire structure set forth in claim 4.

6. The method as set forth in claim 1, further comprising of:
calculating a predictive shape of the finite element model at the time when only a degree of freedom in a tangential direction is allowed to a joint which is bound at the contact point and the control point is displaced to the next position at the time of the crossing.

7. A computer-readable recording medium for causing a computer to execute the method of calculating a predictive shape of a wire structure set forth in claim 6.

8. A computer-readable recording medium for causing a computer to execute the method of calculating a predictive shape of a wire structure set forth in claim 1.

9. A calculating apparatus for calculating a predictive shape of a wire structure, comprising:
a finite element model creating unit that creates a finite element model of the wire structure, the finite element model being formed as an elastic body having a plurality of beam elements combined at respective joints linearity;
a setting unit that sets physical properties and restriction conditions of the wire structure to the finite element model;
a predictive shape calculating unit that calculates a predictive shape of the finite element model which is in a physically balanced condition based on the physical properties and the restriction conditions;
a crossing determining unit that determines whether the predictive shape of the finite element model crosses an obstacle model representing an obstacle when a control point of the wire structure is displaced;

a joint binding unit that returns the control point of the finite element model to a position corresponding to a position immediately before the crossing of the joint with the obstacle model, and that binds a crossing joint which is the joint crossing with the obstacle model, to a contact point of the finite element model with the obstacle model, when it is determined that the predictive shape crosses the obstacle model; and a predictive shape output unit that outputs the predictive shape at the time when the control point is returned to a position at the time of crossing of the finite element model with the obstacle model while maintaining the binding.

\* \* \* \* \*